US008539192B2

(12) United States Patent
Castillo et al.

(10) Patent No.: US 8,539,192 B2
(45) Date of Patent: Sep. 17, 2013

(54) EXECUTION OF DATAFLOW JOBS

(75) Inventors: Claris Castillo, White Plains, NY (US);
Michael J. Spreitzer, Croton On Hudson, NY (US); Malgorzata Steinder, Leonia, NJ (US); Ian N. Whalley, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 12/684,343

(22) Filed: Jan. 8, 2010

(65) Prior Publication Data

US 2011/0173410 A1    Jul. 14, 2011

(51) Int. Cl.
*G06F 12/00*        (2006.01)

(52) U.S. Cl.
USPC .................. 711/170; 711/112; 711/E12.046

(58) Field of Classification Search
USPC .................. 711/112, 170, 173, 129, E12.046
See application file for complete search history.

(56) References Cited

U.S. PATENT DOCUMENTS

| | | | | |
|---|---|---|---|---|
| 6,345,384 | B1* | 2/2002 | Sato | 717/160 |
| 7,340,522 | B1* | 3/2008 | Basu et al. | 709/226 |
| 7,590,620 | B1 | 9/2009 | Pike et al. | |
| 7,836,454 | B1* | 11/2010 | Coleman et al. | 719/312 |
| 2005/0172076 | A1* | 8/2005 | Olson et al. | 711/122 |
| 2007/0083557 | A1* | 4/2007 | Leiserowitz et al. | 707/104.1 |
| 2008/0010181 | A1* | 1/2008 | Infanger | 705/36 R |
| 2008/0034160 | A1 | 2/2008 | Neiman et al. | |
| 2010/0262871 | A1* | 10/2010 | William | 714/48 |
| 2010/0312984 | A1* | 12/2010 | Robin et al. | 711/171 |
| 2011/0041006 | A1* | 2/2011 | Fowler | 714/10 |

FOREIGN PATENT DOCUMENTS

WO    WO 2011/018646    *  2/2011

OTHER PUBLICATIONS

Richard M. Yoo et al., "Phoenix Rebirth: Scalable MapReduce on a Large-Scale Shared-Memory System", Proceedings of the IEEE International Symposium on Workload Characterization (IISWC), Austin, TX, Oct. 2009, IEEE.
Colby Ranger et al., "Evaluating MapReduce for Multi-core and Multiprocessor Systems", Proceedings of the 13th Intl. Symposium on High-Performance Computer Architecture (HPCA), Phoenix, AZ, Feb. 2007, IEEE.
Jeffrey Dean et al., "MapReduce: Simplified Data Processing on Large Clusters", Proceedings of OSDI '04: 6th Symposium on Operating System Design and Implemention,San Francisco, CA, Dec. 2004, USENIX Association Berkeley, CA, USA.

* cited by examiner

*Primary Examiner* — Pierre-Michel Bataille
(74) *Attorney, Agent, or Firm* — Ido Tuchman; Preston J. Young

(57) ABSTRACT

A method, system and computer program product for storing data in memory. An example system includes at least one multistage application configured to generate intermediate data in a generating stage of the application and consume the intermediate data in a subsequent consuming stage of the application. A runtime profiler is configured to monitor the application's execution and dynamically allocate memory to the application from an in-memory data grid.

19 Claims, 3 Drawing Sheets

EXECUTION OF DATAFLOW JOBS

BACKGROUND

Multi-stage or dataflow programming frameworks such as MapReduce and Pig has gained enormous popularity for large-scale parallel data processing in the large couple of years. Websites such as Facebook, The New York Times, Yahoo!, and many others use Hadoop, an open-source implementation of MapReduce, for various data processing needs. As a matter of fact, there is an increasing need for adding multi-purpose data-analytic capabilities to non-traditional data-intensive applications. For example, several online applications, such as financial applications, demand the ability to collect and process large amounts of data sets in an ad-hoc manner without having to submit processing jobs in batch mode to a data warehouse in an online manner.

Two factors have played a catalyzing role in this trend. First, the low economical and technological entry barriers of computational (data processing) open source tools like Hadoop; and second, the decreasing price of storage capacity. As such trends increase and gain economical significance by helping service providers differentiate from their competitors, the vision of data-analytic Clouds that can manage resources efficiently to support/execute dataflows while meeting SLA requirements seems more realizable.

SUMMARY OF THE INVENTION

Aspects of the present invention include a methodology for reducing data storage latency for jobs with stringent time requirements. As discussed in more detail below, an in-memory data grid or in-memory data storage is used to improve the latency of dataflow jobs.

An example embodiment of the invention is a system for storing data in memory. The system includes at least one multistage application configured to generate intermediate data. The intermediate data is generated in a generating stage of the application and consumed in a subsequent consuming stage of the application. A runtime profiler is configured to monitor the application's execution and dynamically allocate memory to the application from an in-memory data grid.

Another example embodiment of the invention is a method for storing data in memory. The method includes receiving an estimation of memory required to store intermediate data of a multistage application. The multistage application is configured to generate the intermediate data in a generating stage of the application and consume the intermediate data in a subsequent consuming stage of the application.

The method further includes allocating memory from an in-memory data grid before execution of the multistage application based on the estimation of memory required to store the intermediate data of the multistage application. At an executing operation, the multistage application is executed. At a monitoring operation, a change in memory required to store the intermediate data during execution of the multistage application is monitored. At an adjusting operation, the allocated memory at the in-memory data grid is adjusted based on the change in memory required to store the intermediate data during execution of the multistage application.

Yet another aspect of the invention is a computer program product for storing data in memory. The computer program product includes computer readable program code configured to: receive an estimation of memory required to store intermediate data of a multistage application, allocate memory from an in-memory data grid before execution of the multistage application based on the estimation of memory, monitor a change in memory required to store the intermediate data during execution of the multistage application, and adjust the allocated memory at the in-memory data grid based on the change in memory required to store the intermediate data during execution of the multistage application.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention is described with reference to embodiments of the invention. Throughout the description of the invention reference is made to FIGS. 1-3.

Figure 1:
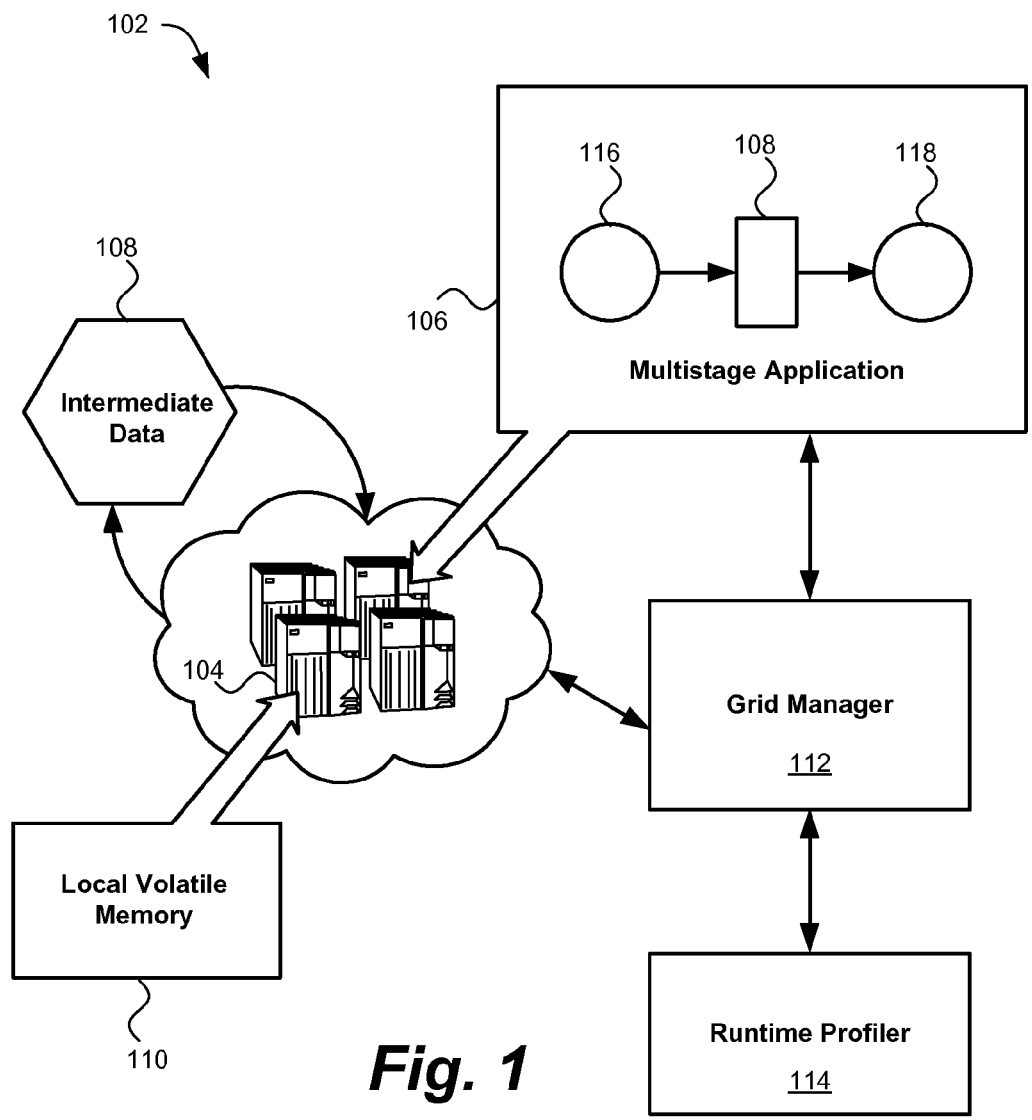
FIG. 1 shows an example system employing the present invention.

FIG. 1 illustrates an example system 102 incorporating an embodiment of the present invention. It is noted that the system 102 shown is just one example of various arrangements of the present invention and should not be interpreted as limiting the invention to any particular configuration.

The system 102 includes a plurality of computers 104 executing a multistage computer application 106 (also referred to herein as a "dataflow job" or "dataflow program") in a computer network. For example, the plurality of computers 104 may be part of a cloud computing structure.

A multistage computer application is a computer application that executes a plurality of tasks in stages successively over time. The multistage computer application 106 generates intermediate data 108. As used herein, intermediate data 108 is data generated by a generating stage 116 of the multistage computer application and subsequently consumed by a consuming stage 118 of the application 106.

Each computer 104 includes local volatile memory 110. The local volatile memory 110 is characterized by its low latency access parameters in comparison to disk-based storage (i.e., persistent memory). Typically, the local volatile memory 110 includes DRAM and/or SRAM integrated circuits.

The system 102 may further include a grid manager 112 configured to couple the local volatile memory 110 of each computer 104 and form an in-memory data grid. The grid manager 112 forms the in-memory data grid by controlling memory processes distributed access the multiple computers 104. Each memory process serves the role of a memory container locally in the computer. The memory process therefore has a large memory footprint (large amount of memory allocated to it). More importantly, the container memory has very small latency because a data request to it does not hit the disk storage.

A runtime profiler 114 may be coupled to the grid manager 112. The runtime profiler 114 is configured to monitor the application's execution and dynamically allocate memory to the application 106 from an in-memory data grid. In one embodiment, the runtime profiler 114 reassess the memory requirements of the application after each stage and adjusts the allocated memory at the in-memory data grid accordingly.

By doing so, disk access can be avoided by storing intermediate data in an in-memory data grid. Thus, the system 102 improves the latency of the multistage application.

Figure 2:
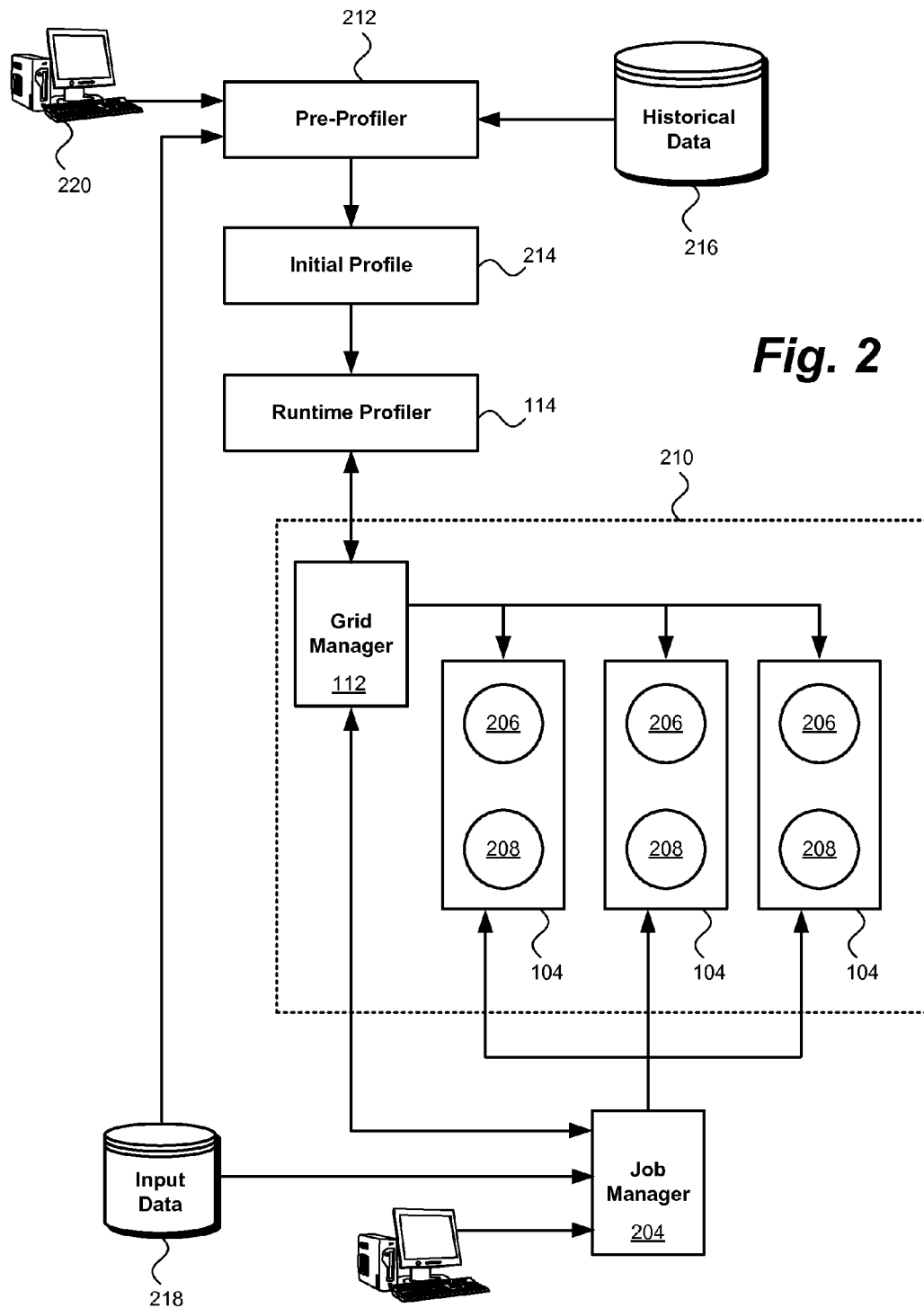
FIG. 2 shows another example system incorporating the present invention.

Turning now to FIG. 2, another system embodiment of the invention is shown. A job manager 204 is coupled to the plurality of computers 104. Each computer 104 includes a grid process 206 and worker process 208. The worker process 208 hosts tasks that consume intermediate data stored in the grid processes 206. The job manager 204 is responsible for scheduling and matching computations (compute processes) performed at the worker processes 208.

An in-memory data grid 210 consists of multiple grid processes 206 distributed across the multiple computers 104. The grid manager 112, as mentioned above, is responsible for managing the grid processes 206. Some of the management responsibilities of the grid manager 112 are: creating/destroying grid processes 106, allocating memory, replicating grid processes 106, migrating grid processes across computers 104, and partitioning data across grid processes 206. Users store and update data entries in grid processes 206 by means of appropriate interfaces, such as CRUD (Create/Read/Update/Delete).

The system may include a pre-profiler 212. The pre-profiler 212 is configured to generate, prior to execution of the multistage application, an initial profile 214 received by the runtime profiler 114. The initial profile 214 provides an estimated allocation of memory needed from the in-memory data grid 210 to store intermediate data for the multistage application.

In the context of the present invention, profile information includes memory requirements for each intermediate data set. Such information can be obtained in multiple ways. For example, previous executions of the same multistage application, execution of a significant subset of the multistage application in a sandbox environment prior to starting the main execution, and profile information from similar applications. This information resides in historical data 216 and can be updated and processed as more information is collected.

Thus, in one embodiment, the initial profile 214 is based, at least in part, on historical data 216 about a size of the intermediate data generated by the multistage application. In another embodiment, the initial profile 214 is based, at least in part, on input data 218 to the multistage application. In another embodiment, the initial profile 214 is based, at least in part, on user input 220 indicating an approximate size of the intermediate data generated by the multistage application.

The runtime profiler 114 receives the initial profile 214 from the pre-profiler 212 and allocates memory from the in-memory data grid 210 for the multistage application. Furthermore, the runtime profiler 114 receives information about the multistage application during the application's execution. Such information may include the current stage of the application and projected memory demand of the application.

Based on the initial profile 214, the runtime profiler 114 issues a request to the grid manager 112 to allocate grid processes 206 with enough capacity to hold the intermediate data generated by the multistage application 106. The number of grid processes 206 and their individual capacities depend on the current state of the system and the management policies of the grid manager 112.

At run-time the system informs the processes of the location of their input (output) data so the processes can read (write) data from (to) the in-memory data grid 210. To do this, the system can rely on the indexing capabilities of the grid manager 112 so that the multistage application can read/write data independently of the location of the data. This feature enables the transparent management of intermediate data and storage.

In one embodiment, as the run-time profiler 114 collects information regarding the progress of the multistage application, the memory demand and resource usage, it hints the grid manager 112 so it can take the actions needed to ensure that enough resources are available to store the intermediate data generated by the multistage application. This is an important feature since the output of the pre-profiler 212 may not reflect the actual demand of a running data flow for multiple reasons. For example, a data flow that has run in the past with a small input data set may result in an initial profile 214 that requires small amount of memory. However, if the size of the input data 218 increases or its characteristics change, the amount of memory pre-allocated based on the pre-profiler 212 may not be enough for the current instance of the multistage application. Such situation may be detected at runtime by monitoring the current total size of the intermediate data and the progress of the multistage application. In view of such anomalies the grid manager 112 may react in multiple ways. For example, it may migrate the grid processes 206 to machines 104 with larger remaining memory available or, depending on the service level agreement established, offload data into disk.

Another embodiment of the invention is a method for storing data in memory. Broadly, the steps involved in one embodiment of the invention include:

1. Obtaining, prior to starting the job, an initial profile for the job;

2. Responsive to the initial profile, allocating, prior to the execution of each stage of the job, one or more areas of memory in the in-memory data grid that the profile suggests will be large enough to hold the output data from that stage;

3. Configuring each stage, as it is executed, to read its input data from the areas of the in-memory data grid into which its data-providing stages placed their output data, and to write its output data into the area created for its output data;

4. Modifying the areas of the in-memory data grid for each stage based on information received from the runtime profiler, in order to ensure that each stage has sufficient space for its output data.

By using an in-memory data grid or in-memory data storage, dataflow jobs that run in infrastructures like Hadoop can improve their latency. This is because disk access is avoided as intermediate data is stored on an in-memory data grid.

Figure 3:
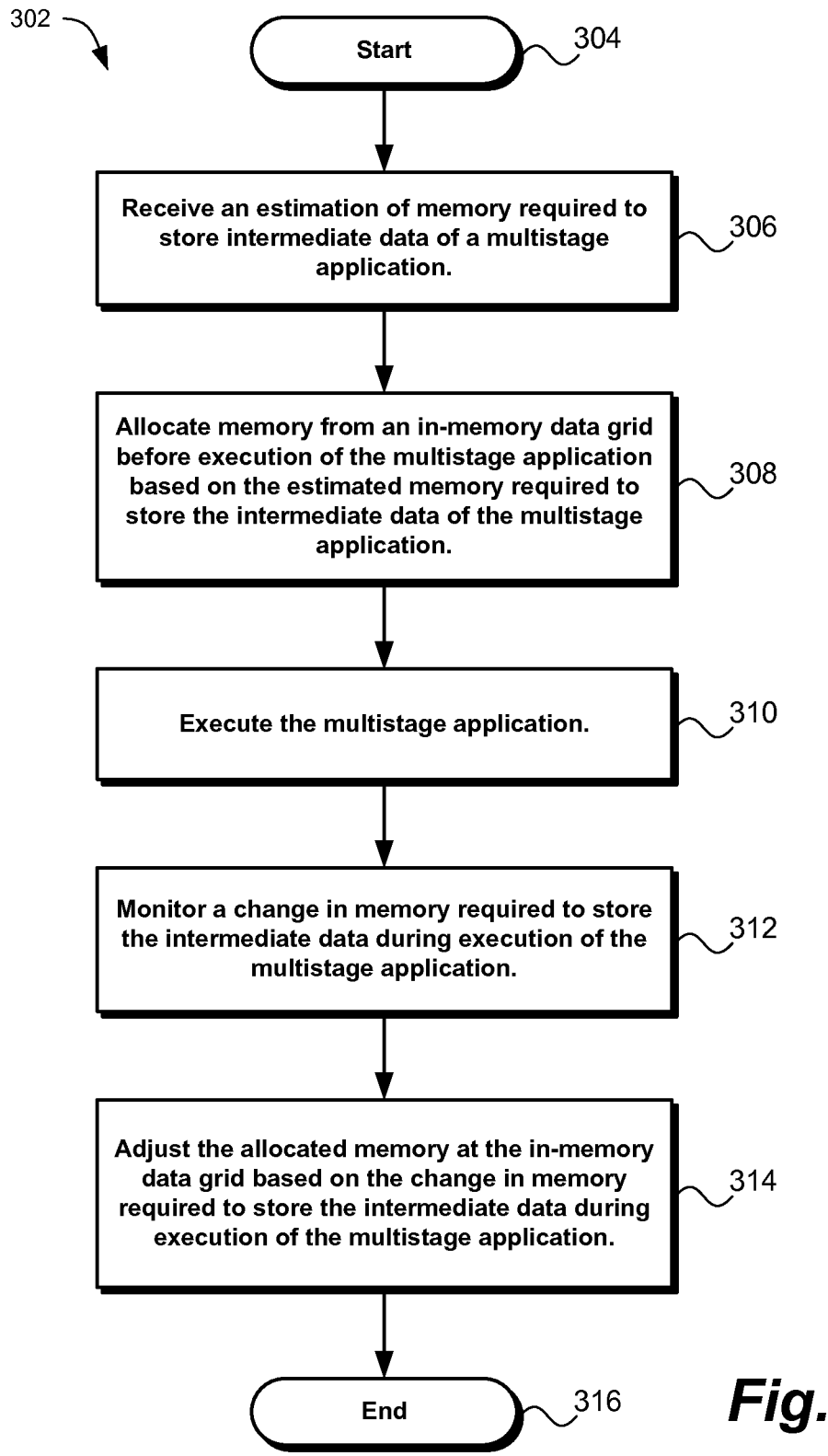
FIG. 3 shows an example flowchart for storing data, as contemplated by the present invention.

An example method contemplated by the present invention is now described with reference to flowchart 302 of FIG. 3. The method begins at Block 304 and includes receiving an estimation of memory required to store intermediate data of a multistage application at Block 406. As discussed above, the multistage application is configured to generate the intermediate data in a generating stage of the application and consume the intermediate data in a subsequent consuming stage of the application.

As discussed above, the estimation of memory required to store the intermediate data of the multistage application may be based, at least in part, on historical data about a size of the intermediate data generated by the multistage application, on input data to the multistage application, and/or on user input indicating an approximate size of the intermediate data generated by the multistage application.

The method further include allocating memory from an in-memory data grid before execution of the multistage application based on the estimation of memory required to store the intermediate data of the multistage application at Block 308. As detailed above, the in-memory data grid includes a plurality of computers, with each computer including local volatile memory. A grid manager couples the local volatile memory of each computer to form the in-memory data grid. At Block 310, the multistage application is executed.

Next, at Block 312, a change in memory required to store the intermediate data during execution of the multistage application is monitored. In one embodiment, monitoring the change in the memory required to store the intermediate data includes receiving, from the grid manager, indication of execution progress of the multistage application.

At Block 314, the allocated memory at the in-memory data grid is adjusted based on the change in memory required to store the intermediate data during execution of the multistage application. The allocated memory at the in-memory data grid is adjusted to ensure the multistage application has sufficient memory to store the intermediate data at each stage of its execution.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for storing data in memory:
    at least one multistage application configured to generate intermediate data in a generating stage of the application and consume the intermediate data in a subsequent consuming stage of the application;
    a runtime profiler configured to monitor the application's execution and dynamically allocate memory to the application from an in-memory data grid; and
    a pre-profiler configured to generate, prior to execution of the multistage application, an initial profile received by the runtime profiler, the initial profile providing an estimated allocation of memory needed from the in-memory data grid to store intermediate data for the multistage application.

2. The system of claim 1, further comprising:
    a plurality of computers, each computer including local volatile memory; and
    a grid manager coupling the local volatile memory of each computer to form the in-memory data grid.

3. The system of claim 1, wherein the initial profile is based, at least in part, on historical data about a size of the intermediate data generated by the multistage application.

4. The system of claim 1, wherein the initial profile is based, at least in part, on input data to the multistage application.

5. The system of claim 1, wherein the initial profile is based, at least in part, on user input indicating an approximate size of the intermediate data generated by the multistage application.

6. A method for storing data in memory:
    receiving an estimation of memory required to store intermediate data of a multistage application, the multistage application configured to generate the intermediate data in a generating stage of the application and consume the intermediate data in a subsequent consuming stage of the application;
    allocating memory from an in-memory data grid before execution of the multistage application based on the estimation of memory required to store the intermediate data of the multistage application;
    executing the multistage application;
    monitoring a change in memory required to store the intermediate data during execution of the multistage application; and
    adjusting the allocated memory at the in-memory data grid based on the change in memory required to store the intermediate data during execution of the multistage application.

7. The method of claim 6, wherein the estimation of memory required to store the intermediate data of the multistage application is based, at least in part, on historical data about a size of the intermediate data generated by the multistage application.

8. The method of claim 6, wherein the estimation of memory required to store the intermediate data of the multistage application is based, at least in part, on input data to the multistage application.

9. The method of claim 6, wherein the estimation of memory required to store the intermediate data of the multistage application is based, at least in part, on user input indicating an approximate size of the intermediate data generated by the multistage application.

10. The method of claim 6, wherein allocated memory at the in-memory data grid is adjusted to ensure the multistage application has sufficient memory to store the intermediate data at each stage of its execution.

11. The method of claim 6, wherein the in-memory data grid includes a plurality of computers, each computer including local volatile memory, and a grid manager coupling the local volatile memory of each computer to form the in-memory data grid.

12. The method of claim 11, wherein monitoring the change in the memory required to store the intermediate data includes receiving from the grid manager indication of execution progress of the multistage application.

13. A computer program product for storing data in memory, the computer program product comprising:
    a non-transitory computer readable storage medium having computer readable program code embodied therewith, the computer readable program code configured to:
        receive an estimation of memory required to store intermediate data of a multistage application, the multistage application configured to generate the intermediate data in a generating stage of the application and consume the intermediate data in a subsequent consuming stage of the application;
        allocate memory from an in-memory data grid before execution of the multistage application based on the estimation of memory required to store the intermediate data of the multistage application;
        monitor a change in memory required to store the intermediate data during execution of the multistage application; and
        adjust the allocated memory at the in-memory data grid based on the change in memory required to store the intermediate data during execution of the multistage application.

14. The computer program product of claim 13, wherein the estimation of memory required to store the intermediate data of the multistage application is based, at least in part, on historical data about a size of the intermediate data generated by the multistage application.

15. The computer program product of claim 13, wherein the estimation of memory required to store the intermediate data of the multistage application is based, at least in part, on input data to the multistage application.

16. The computer program product of claim 13, wherein the estimation of memory required to store the intermediate data of the multistage application is based, at least in part, on user input indicating an approximate size of the intermediate data generated by the multistage application.

17. The computer program product of claim 13, wherein allocated memory at the in-memory data grid is adjusted to ensure the multistage application has sufficient memory to store the intermediate data at each stage of its execution.

18. The computer program product of claim 13, wherein the in-memory data grid includes a plurality of computers, each computer including local volatile memory, and a grid manager coupling the local volatile memory of each computer to form the in-memory data grid.

19. The computer program product of claim 18, wherein the computer readable program code for monitoring the change in the memory required to store the intermediate data includes the computer readable program code for receiving from the grid manager indication of execution progress of the multistage application.

* * * * *